Figure 1:
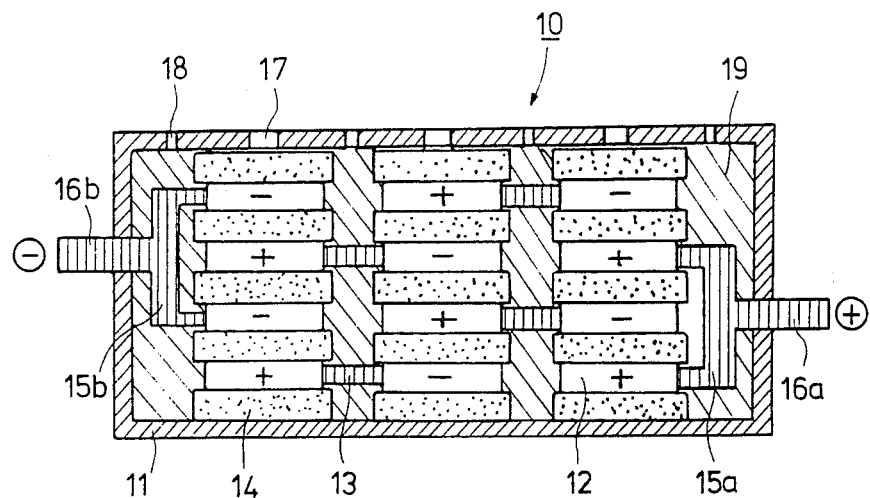

United States Patent [19]

Blomberg et al.

[11] Patent Number: 4,777,101
[45] Date of Patent: Oct. 11, 1988

[54] STORAGE BATTERY

[75] Inventors: Mats Blomberg; Markku Loponen, both of Porvoo, Finland

[73] Assignee: Neste Oy, Finland

[21] Appl. No.: 88,845

[22] PCT Filed: Dec. 16, 1986

[86] PCT No.: PCT/FI86/00150
§ 371 Date: Jul. 21, 1987
§ 102(e) Date: Jul. 21, 1987

[87] PCT Pub. No.: WO87/04011
PCT Pub. Date: Jul. 2, 1987

[30] Foreign Application Priority Data

Dec. 19, 1985 [FI] Finland ................................ 855096

[51] Int. Cl.$^4$ .......................................... H01M 10/04
[52] U.S. Cl. .................... 429/129; 429/160; 429/204; 429/210; 429/225
[58] Field of Search .............. 429/131, 129, 132, 149, 429/153, 163, 145, 204, 225, 228, 210, 160

[56] References Cited

U.S. PATENT DOCUMENTS 2,904,614  9/1959  Gottschall .................... 429/163 X
2,968,686  1/1961  Duddy .............................. 429/145
3,003,012  10/1961 Duddy .............................. 429/153
4,331,747  5/1982  Julian et al. ...................... 429/160

FOREIGN PATENT DOCUMENTS 195567   9/1986  European Pat. Off. .
1548813  5/1977  Fed. Rep. of Germany .
WO84/02230 6/1984 PCT Int'l Appl. .
2158285  11/1985 United Kingdom .

Primary Examiner—Anthony Skapars
Attorney, Agent, or Firm—Steinberg & Raskin

[57] ABSTRACT

The invention concerns a storage battery (10), comprising one or several cells enclosed in a housing (11), each cell containing electrolyte and monopolar and bipolar plates (12,13) coated with positive and/or negative active mass and separated by means of separator plates (14), and requisite electrically conductive connectors connecting the plates and/or cells. The wall separating or sealing off each cell from adjacent cells and/or from the housing (11) has been formed by filling the spaces around and/or in the interstices of the plate stacks with an electrically insulating and electrolyte-impermeable substance (19) which has been cured directly in situ for forming tightly sealing and/or insulating walls.

15 Claims, 2 Drawing Sheets

STORAGE BATTERY

The present invention concerns a storage battery comprising one or several cells enclosed in a housing, each cell containing electrolyte and monopolar or bipolar plates coated with positive and/or negative active mass and separated by separator plates, and requisite electrical connectors connecting with each other the cells and/or plates.

Traditional lead storage batteries usually consist of plates enclosed in a cell and immersed in an electrolyte which have a current-carrying conductor part, a plate frame made of lead or of a lead alloy, and active mass, which usually has been pasted onto the plate frames. The plates frames have lugs on their margins by which they are soldered to current busbars of lead, these in their turn being welded to each other through the cell partitions. When the storage battery is being discharged with high current, the resistance of the plate frames limits the operation of the storage battery in the way that only the active mass in the vicinity of the plate lugs will be efficiently utilized. In order to ensure adequate current passage, an unnecessarily high amount of lead has to be provided on the plate frames, and this increases the weight of the storage battery. Furthermore, in conventional storage batteries battery boxes are used in which the partitions between cells are prefabricated. Not very many current leads can in practice be carried through the partitions to carry current from one cell to the other. The deep battery box with its partitions is a plastic component which is in itself expensive and difficult to manufacture.

Storage battery designs deviating from what is conventional are also known in the art, in which part of the electrodes have been made bipolar. The positive and negative active masses of mutually adjacent cells have been pasted on one and the same plate frame, which has in connection with die casting been fixed at its centre in a plastic frame. These plastic frames have been welded to each other with ultrasonics so that the cell partitions, and at the same time the entire storage battery, are sealed tight. The advantage of a storage battery of this type is low internal resistance and uniform use of the active material, a consequence of the contact from one cell to the other which is divided over the whole area of the partition. The drawback is an exceedingly high number of welds that have to be produced in a welding process, whereby the manufacturing costs will be high.

So-called recombination storage batteries are also known in the art (see e.g. EP No. 01 07 976), in which the plates carrying positive and negative active mass in adjacent cells have been connected with each other by means of bridging pieces. Said bridging pieces may in fact consist of lands connecting plate parts belonging to adjacent cells. In this storage battery type there are no tightly sealed partitions at all between the plate stacks constituting adjacent cells, there is merely an air gap. This structure is only possible in the case that the electrolyte has been absorbed into the separator plates and active masses. The drawbacks include current leakage on the surface of the leads along the electrolyte film; this drawback is the greater the broader the connecting pieces between plates. The current distribution is also still partially non-uniform because all current must pass through said leads.

The object of the invention is a storage battery in which the drawbacks associated with the storage batteries described above have been avoided and a number of significant advantages have been gained which would not be possible using structures conforming to known technology. The storage battery of the invention comprises one or several cells enclosed in a housing, each cell containing electrolyte and monopolar and bipolar plates coated with positive and/or negative active mass, and requisite electrically conductive connectors connecting the plates and/or the cells, and the invention is characterized in that the wall separating or sealing off each cell from adjacent cells and/or from the housing has been formed by filling the spaces around the plate stacks and/or between them with an electrically insulating and electrolyteimpermeable substance which has been cured directly in situ in order to establish tightly sealed and/or insulating walls.

Since in the storage battery of the invention the inter-cell partitions are only formed after the storage battery has been assembled and the plate stacks have been placed in the storage battery housing, this implies that the optimum number of current leads between plates and/or cells can be provided and they can have optimum shape. As a consequence, in the storage battery of the invention low internal resistance is attained, as well as uniform use of active mass, and less lead is required. Furthermore, in the storage battery of the invention there are fewer cast and welded joints than in conventional storage batteries, and the design of the battery housing is simple. Furthermore, the manufacturing of the storage battery of the invention is easy to automate.

In its general form, the invention comprises a storage battery in which the plate stacks have been separated from each other, or from the housing, by filling the empty spaces between plate stacks with an electrically insulating and electrolyte-impermeable substance which has been cured in situ. Tightly sealed partitions between cells have thus been obtained in a simple manner. A particular advantage is gained in a manufacturing technique of this kind owing to the circumstance that the wiring between cells can be as dense as ever required without interfering with or limiting the forming of partitions. Thus the wiring can be made optimal by using a great number of slender conductors which have been uniformly distributed in the interval between plates. When flowing, electrically insulating and electrolyte-impermeable substance is directed into the storage battery housing, even slender wiring between the plates will not be damaged: the wiring remains inside the partitions that are formed on curing and passes therethrough.

The substance separating or sealing the cells and which is impermeable to the electrolyte is advantageously a plastic-based substance which can be forced in liquid state into the storage battery, whereat it spreads uniformly and fills the empty spaces between plates, and becomes cured in situ. Curing may be accomplished in any way known in itself in the art, e.g. with the aid of reactions based on temperature, on a chemical reaction or on radiation. For substance which is thus cured may be used any substance which can be conducted into the storage battery housing in liquid state and cured in situ to become a wall with adequate sealing and electrical insulating properties. Suitable materials are, among others, polyurethane plastics, polyester plastics, and epoxy plastics. In particular one may with advantage use closed-cell polyurethane foam plastic which is injected into the housing or into a mould immediately after mixing the components, in which case the foaming causes the plastic to fill the empty spaces.

According to an advantageous embodiment of the invention no prefabricated storage battery housing is needed at all if the preassembled plate stacks have been placed in a mould which is thereafter injected full with curable wall material according to the invention, which then at the same time constitutes the storage battery housing.

When the sealing and insulating partitions have been formed in a manner conforming to the present invention, the storage battery may be filled with acid and formed in a manner known in itself in the art, to become a storage battery ready for use.

Although in this connection the invention is described as applied to a lead battery, it is obvious that the technique of the invention may also be applied to those storage batteries in which another material is used for storage battery plate material.

The invention is described in detail, referring to certain advantageous embodiments of the invention presented in the figures of the attached drawings, yet to which the invention is not meant to be exclusively confined.

FIG. 1 presents an advantageous embodiment of the storage battery of the invention, sectioned.

Figures 2A, 2B, 2C:
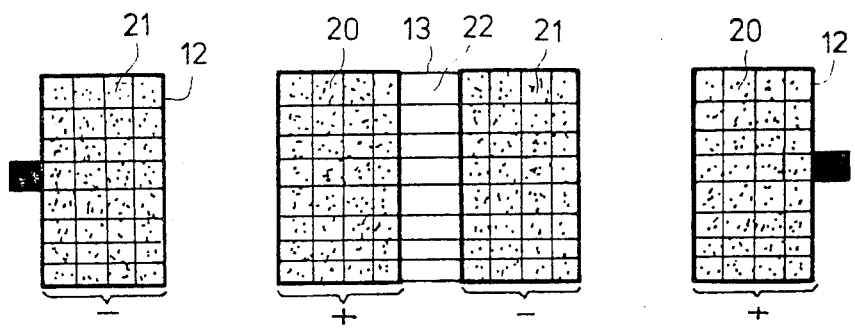

FIG. 2a presents an advantageous embodiment of the negative monopolar plate frame used in the storage battery of the invention, in top view.

FIG. 2b presents an advantageous embodiment of the bipolar plate frame used in the storage battery of the invention, in top view.

FIG. 2c presents an advantageous embodiment of the positive monopolar plate frame used in the storage battery of the invention, in top view.

Figure 3:
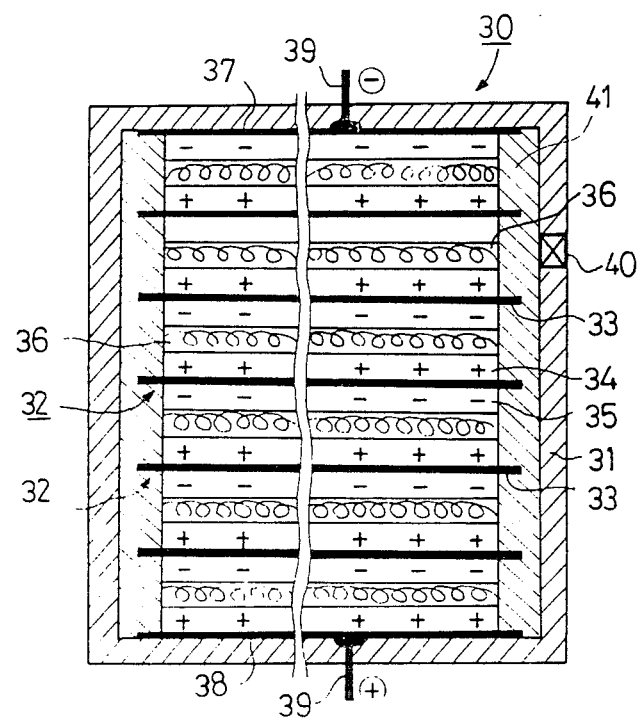

FIG. 3 presents another advantageous embodiment of the storage battery of the invention, in vertical section.

In the embodiment of FIG. 1, the 6-volt storage battery of the invention in general has been denoted with the reference numeral 10. The storage battery 10 comprises one or several cells enclosed in a housing 11. Each cell contains electrolyte and monopolar plates 12 and bipolar plates 13 coated with positive and/or negative active mass and separated with separator plates 14. The storage battery 10 moreover comprises requisite, electrically conductive connectors connecting the plates 12,13 and/or the cells. According to the basic insight of the invention, the wall separating, or sealing off, each cell from adjacent cells or from the housing 11 has been formed by filling the spaces around and between the plate stacks in the housing 11 with an electrically insulating and electrolyte-impermeable substance 19 which has been cured directly in situ to form tightly sealing and/or insulating walls.

In FIG. 1, the lugs connecting plates having the same sign are indicated with reference numeral 15a, respectively 15b. The positive terminal of the storage battery carries the reference numeral 16a and the negative terminal, similarly, the numeral 16b. The reference numeral 18 indicates an injection hole through which electrically insulating and electrolyte-impermeable substance is conducted into the housing 11. Reference numeral 17 indicates the acid-filling hole through which the storage battery 10 is provided with acid in a manner known in itself in the art, for producing a storage battery ready for use. As shown in FIG. 2a, the monopolar plate frame 12 has been provided with negative active mass 21, as shown in FIG. 2b, the bipolar plate frame 13 has been provided with positive active mass 20 and negative active mass 21, the intermediate part 22 being unfilled, and as shown in FIG. 2c, the monopolar plate frame 12 has been provided with positive active mass 20.

The electrically conductive bipolar plate 13 or bipolar plate lattice consists of a reticular structure containing electrically conductive material and of which one end 20 has been coated with positive and the other end 21 with negative active mass, and on which the intermediate part 22 is uncoated. A reticular structure of this kind is composed of an electrically non-conductive supporting structure to which have been joined electrically conductive wires, or an electrically conductive reticular structure.

According to an advantageous embodiment of the invention, the storage battery of FIG. 1 consists of monopolar and bipolar plates 12,13 and separator plates 14 stacked upon each other, in such way that in the extreme outside cells every second plate is monopolar 12 and every second is the end with opposite sign of a bipolar plate 13. At the points between cells, the uncoated parts 22 of the bipolar plates 13 are in register and constitute current conductors passing through the insulating and/or sealing partition that is formed when the electrically insulating and electrolyte-impermeable substance 19 is cured.

In FIG. 3 is depicted the design principle of a 12-volt storage battery. The bipolar elements 32 consist of an electrically connductive plate 33 which is coated on one side with positive active mass 34 and on the other side with negative active mass 35. Between the bipolar elements 32 are placed separator plates 36 which separate the active masses of opposite signs on the surfaces of adjacent plates 33.

The structure of the separator plates 36 is porous, and they contain part of the electrolyte acid which is required for operation of the storage battery 30. Part of the acid is of course contained in the active masses 34 and 35.

On the ends of the bipolar element stacks are provided end plates 37 and 38 which have been coated with active mass on one side only. To the end plates 37 and 38 have been attached leads or busbars 39 for taking off electric current.

The bipolar element stack has been placed in an enclosed, gas-tight housing 31, which is provided with at least one pressure relief valve 40, which prevents damage to the housing 31 of the storage battery 30 from gas generation due to excessively violent charging or discharging.

In an advantageous embodiment of the invention, in the storage battery of FIG. 3, the bipolar plates 33 consist of tightly sealing, electrically conductive films on one side of which has been applied a coat of positive, and on the other side of negative, active mass 34,35. The storage battery is composed of monopolar plates 37,38, separator plates 36 and bipolar plates 33 stacked upon each other in the housing 31 in such manner that outermost are placed the monopolar plates 37,38 and between these the requisite number of bipolar plates 33. Each single cell is constituted by the negative monopolar plate 37 or the negative half 35 of one bipolar plate 33, the positive half 34 of one bipolar plate 33 or the positive monopolar plate 38, and the separator plate 36 between them. The layer separating the plate stacks from each other and/or from the wall of the housing 31 and/or sealing them thereagainst has been formed by filling the free spaces between the plate stacks and the storage battery housing with an electrically insulating and electrolyte-impermeable substance 41, whereafter this substance has been cured in situ to form an insulating and/or sealing layer. In this connection an injection hole similar to the injection hole 18 in FIG. 1 is formed in the housing 31.

In the storage battery of the invention, the negative active material 21,35 is advantageously metallic lead, and the positive active material 20,34 is lead dioxide, and the electrolyte is an aqueous solution of sulphuric acid. For the insulating and sealing material 19,41 it is advantageous to use polyurethane or polyurethane foam, or a plastic-based product which can be made flowing and injectable by heating and which hardens, or is cured, on cooling. One such insulating and sealing substance 19,41 is polyester or epoxy which hardens on injection either with the aid of a hardener or of heat treatment.

In an advantageous embodiment of the invention, after stacking, placing in the housing 11,31 and fitting the electric connections the empty spaces have been filled with insulating and sealing substance 19,41, whereafter the storage battery 10,30 has been filled with acid and formed in a way known in itself in the art.

In an advantageous embodiment, after stacking, placing in the housing 11,31 and fitting the electric connections the storage battery 10,30 has been filled with acid in such manner that all acid can be absorbed in the active materials 20,21;34,35 and in the separator plates 14,36 without there being so much free electrolyte in the storage battery that it could cause short-circuits between different cells, wherafter the storage battery has been formed in a way known to itself in the art and filled of its empty spaces with insulating and sealing material 19,41.

In conjunction with the cells free cavities have been left when applying the insulating and sealing substance 19,41 in which extra electrolyte may be placed.

We claim:

1. A storage battery, comprising one or several cells enclosed in a housing, each cell containing electrolyte and monopolar and bipolar plates coated with positive and/or negative active mass and separated by means of separator plates, and requisite electrically conductive connectors connecting the plates and/or cells, characterized in that the wall separating or sealing off each cell from adjacent cells and/or from the housing has been formed by filling the spaces around and/or in the interstices of the plate stacks with an electrically insulating and electrolyte-impermeable substance which has been cured directly in situ for forming tightly sealing and/or insulating walls.

2. Storage battery according to claim 1, characterized in that said electric connections pass through the spaces around and between said plate stacks, said connections passing after the curing of the electrically insulating and electrolyte-impermeable substance within or through the tightly sealing and/or insulating walls.

3. Storage battery according to claim 1, characterized in that a bipolar plate consists of an electrically conductive plate or plate lattice of which one end is coated with positive active mass and the other end with negative active mass and on which the electric connection is constituted by an uncoated area of the plate or plate lattice between the coated areas, located at the site of an insulating and/or sealing wall, produced by curing electrically insulating an electrolyte-impermeable substance, and passing therethrough.

4. Storage battery according to claim 3, characterized in that an electrically conductive bipolar plate or bipolar plate lattice consists of recticular structure containing electrically conductive material, of which one end is coated with positive and the other end with negative active mass and of which the intermediate part is uncoated.

5. Storage battery according to claim 4, characterized in that the reticular structure consists of an electrically non-conductive supporting structure to which have been joined electrically conductive wires or an electrically conductive reticular structure.

6. Storage battery according to claim 1, characterized in that the storage battery is composed of monopolar and bipolar plates and separator plates stacked upon each other in a housing so that in the outermost cells every second plate is monopolar and every second plate is the end with opposite sign of a bipolar plate, and that in intermediate cells there are alternatingly ends with different signs of bipolar plates, and that at the points between cells are the uncoated portions of the bipolar plates in register, forming current conductors which pass through the insulating and/or sealing partition that has been formed on curing the electrically insulating and electrolyte-impermeable substance.

7. Storage battery according to claim 1 characterized in that the bipolar plates consist of tightly sealing, electrically conductive films on one side of which has been coated positive and in the other side negative active mass, and that the storage battery is composed of monopolar plates, separator plates and bipolar plates stacked upon each other in a housing so that outermost are the monopolar plates and between them the requisite number of bipolar plates stacked upon each other in a housing so that outermost are the monopolar plates and between them the requisite number of bipolar plates, each one cell being formed of a negative monopolar plate or the negative half of a bipolar plate, of the positive monopolar plate, and of a separator plate between them, and that the layer separating and/or sealing off the plate stacks from each other and/or from the walls of the housing has been formed by filling the free spaces between the plate stacks and the storage battery housing with an electrically insulating and electrolyte-impermeable substance, which has thereafter been cured in situ to form an insulating and/or sealing layer.

8. Storage battery according to claim 6, characterized in that the plate stacks have been placed in a mould, whereby the electrically insulating and electrolyte-impermeable insulating and/or sealing substance cured in the mould at the same time constitutes the storage battery housing.

9. Storage battery according to claim 1, characterized in that the negative active material is metallic lead and the positive active material is lead dioxide, and the electrolyte is an aqueous solution of sulphuric acid.

10. Storage battery according to claim 1, characterized in that said insulating and/or sealing substance is polyurethane or polyurethane foam.

11. Storage battery according to claim 1, characterized in that said insulating and/or sealing substance is a plasticbased product which can be made flowing and injectable by heating and which hardens on cooling.

12. Storage battery according to claim 1, characterized in that said insulating and/or sealing substance is polyester or expoy which becomes cured after injection with the aid either of a hardener or of heat treatment.

13. Storage battery according to claim 1, characterized in that after stacking, placing in the housing and performing the electric connecting the empty spaces have been filled with said insulating and/or sealing substance, whereupon the storage battery has been acid-filled and formed in a manner known in itself in the art.

14. Storage battery according to claim 1, characterized in that after stacking, placing in the housing and performing the electric connections the storage battery has been acid-filled in such manner that all acid may be absorbed in the active materials and in the separator plates without there being so much electrolyte in the storage battery that it could cause short-circuits between different cells, whereafter the storage battery has in a way known in itself in the art been formed and as of its empty spaces filled with said insulating and sealing substance.

15. Storage battery according to claim 1, characterized in that free cavities have been left in conjunction with the cells when applying the insulating and/or sealing substance, in which extra electrolyte can be placed

* * * * *